United States Patent [19]

Aoki et al.

[11] Patent Number: 4,961,830
[45] Date of Patent: Oct. 9, 1990

[54] METHOD OF INHIBITING ADHESION OF BY-PRODUCT INSIDE DUCT IN TREATMENT OF WASTE GAS BY ELECTRON BEAM IRRADIATION

[75] Inventors: Shinji Aoki, Tokyo; Akihiko Maezawa, Yokohama, both of Japan

[73] Assignee: Ebara Corporation, Tokyo, Japan

[21] Appl. No.: 259,537

[22] Filed: Oct. 18, 1988

[30] Foreign Application Priority Data

Oct. 30, 1987 [JP] Japan ............................ 62-273553

[51] Int. Cl.[5] ..................... B01D 53/34; G21K 5/00
[52] U.S. Cl. ........................ 204/157.3; 204/157.44; 204/157.46; 204/157.49; 204/158.2; 423/235
[58] Field of Search .......... 204/157.3, 157.46, 157.49, 204/158.2, 157.44; 423/235, 235 D

[56] References Cited

U.S. PATENT DOCUMENTS

| | | | |
|---|---|---|---|
| 3,951,198 | 4/1976 | Ross et al. | 202/197 |
| 4,231,995 | 11/1980 | Campbell et al. | 423/242 |
| 4,294,674 | 10/1981 | Aoki et al. | 204/157.3 |
| 4,324,759 | 4/1982 | Aoki et al. | 422/62 |
| 4,435,260 | 3/1984 | Koichi et al. | 204/164 |
| 4,507,265 | 3/1985 | Higo et al. | 422/186 |
| 4,595,569 | 6/1986 | Reuter et al. | 204/157.3 |
| 4,596,642 | 6/1986 | Higo et al. | 204/157.3 |

FOREIGN PATENT DOCUMENTS 5275661 12/1970 Japan .
53-17899 6/1977 Japan .

Primary Examiner—John F. Niebling
Assistant Examiner—David G. Ryser
Attorney, Agent, or Firm—Oblon, Spivak, McClelland, Maier & Neustadt

[57] ABSTRACT

In a waste gas treating method wherein waste gas is treated by adding ammonia thereto and irradiating this waste gas with electron beams, the adhesion of a by-product to the inner wall of a duct is inhibited by feeding the waste gas after irradiation with electron beams at a flow velocity of 10 m/sec or less, more preferably 5 m/sec or less, until it at least reaches a first by-product collector. The duct may have a rectangular cross-sectional configuration. Thus, it is possible to inhibit increase in the pressure loss of the waste gas being treated and enable stable operation of the waste gas treating process.

8 Claims, 2 Drawing Sheets

METHOD OF INHIBITING ADHESION OF BY-PRODUCT INSIDE DUCT IN TREATMENT OF WASTE GAS BY ELECTRON BEAM IRRADIATION

BACKGROUND OF THE INVENTION

1. Field of the Invention

The present invention relates to a method of inhibiting adhesion of a by-product inside a duct, the method being effectively employed in a waste gas treatment wherein waste gas which contains poisonous gas components such as $SO_x$ and/or $NO_x$ and which has ammonia added thereto is irradiated with electron beams to change these poisonous gas components into by-products which are useful as fertilizers, e.g., ammonium sulfate and ammonium nitrate.

2. Description of the Prior Art

It has heretofore been known to treat waste gas which contains poisonous gas components such as $SO_x$ and/or $NO_x$ by adding ammonia to the waste gas, irradiating this waste gas with electron beams to thereby change the poisonous gas components into ammonium sulfate and/or ammonium nitrate, and collecting the resulting by-product.

FIG. 1 illustrates a typical flow sheet and apparatus of a commercial plant to which the above-described conventional method for treating waste gas is applied. Waste gas which is generated from a boiler 1 is allowed to cool down to, in general, about 150° C. and this gas is sprayed with cooling water 4 in a cooling tower 3 so that the gas temperature at the outlet of the cooling tower 3 is about 70° C. Then, ammonia is added to the waste gas and the mixture is introduced into a reactor 7 where it is irradiated with electron beams. $SO_x$ and $NO_x$ in the waste gas are oxidized by irradiation with electron beams to form sulfuric acid and nitric acid, respectively, which further react with ammonia to form dust particles such as ammonium sulfate and ammonium nitrate. The waste gas containing the resulting dust particles is passed through a duct and introduced into a by-product dust collector where the dust is separated from the gas and then the treated gas is released into the atmosphere.

When waste gas is irradiated with electron beams, X-rays are partially generated by bremsstrahlung. As is well known, the rate of generation of X-rays by bremsstrahlung is quite small, but, since the range of the generated X-rays is longer than that of electron beams, the X-rays must be shielded by means, for example, of lead or concrete.

FIG. 2 illustrates the structure of a typical irradiation chamber of an apparatus for carrying out the waste gas treating method. In this apparatus, the electron beam irradiation sections 8' of the electron beam accelerator and the reactor 7 are installed in an irradiation chamber 13 made of a shielding material, for example, concrete, as shown in FIG. 2, in order to provide a shield against X-rays resulting from the irradiation with electron beams. A maze (zigzag passage) 15 is defined by the shielding materials, and ducts 5' and 9' for introducing waste gas into the reactor 7 and discharging the gas irradiated with electron beams from the reactor 7 are disposed zigzag fashion along the maze 15, thereby allowing electron beam irradiation to be carried out with a shield provided against X-rays. The maze 15 is generally arranged in such a manner that the passage is bent two or three times at substantially right angles, thereby preventing X-rays from leaking out of the irradiation chamber 13.

X-rays that penetrate into the shielding material decay therein but some of them are reflected. The intensity of the reflected X-rays is exceedingly weak, i.e., one/hundredths to one/thousandths of that of the X-rays before reflection. Accordingly, it is possible to provide an effective shield against the X-rays by means of a maze having a structure in which the passage is bent two or three times at substantially right angles.

The waste gas that contains dust particles of a by-product produced by the irradiation with electron beams is introduced into the by-product dust collector 10 outside the irradiation chamber 13 through the maze-like duct 9 having such a structure that the duct is bent two or three times at substantially right angles. Inside this maze-like duct, particularly the portions which are bent at substantially right angles, adhesion and deposition of dust are found to occur, and these lead to an increase in pressure loss of the waste gas being treated and disturbance of stable operations.

SUMMARY OF THE INVENTION

It is a primary object of the present invention to provide a method of inhibiting adhesion of a by-product inside a duct. As a result, it is possible to inhibit increase in the pressure loss of the waste gas being treated and to enable stable operation of the waste gas treating process.

The above and other objects, features and advantages of the present invention will become more apparent from the following description taken in conjunction with the accompanying drawings.

DETAILED DESCRIPTION OF THE PREFERRED EMBODIMENT

Figure 1:
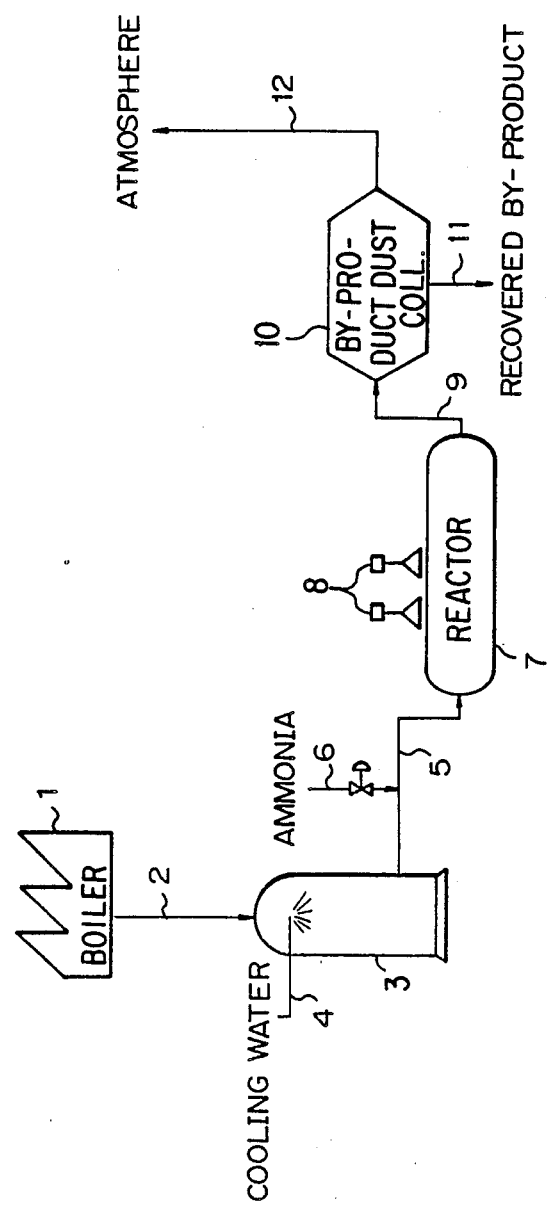
FIG. 1 illustrates a typical flow sheet in a method of treating waste gas by irradiation with electron beams.

It has been revealed that it is possible to reduce markedly the adhesion and deposition of dust by setting the flow velocity of the gas within the duct extending from the outlet of the reactor to the by-product dust collector at 10 m/sec or less. It is particularly preferable to set the gas flow velocity at 5 m/sec or less.

In general, the waste gas duct that extends from the boiler to the dust collector is designed so that the flow velocity of the waste gas therein is from 15 to 25 m/sec. This is based on the idea that, if the gas flow velocity is low, such matter as dust (fly ash) contained in coal combustion gas may settle and deposit and therefore the gas flow velocity must be set at a relatively high level in order to ensure that the dust is blown away together with the waste gas.

At first, we also adopted a flow velocity of 20 m/sec as the waste gas flow velocity in the duct extending from the electron beam irradiation reactor to the by-product dust collector. However, the by-product dust became attached to the inner wall of the duct within a short period of time. The flow velocity was, therefore, raised with a view to enhancing the efficiency with which the dust is blown away. However, contrary to our expectations, the rate of adhesion of dust increased as the gas flow velocity became higher.

Investigation of the by-product dust attached to the duct revealed that many of the dust particles have exceedingly small particle diameters, i.e., below the submicron order, and the dust particles are hygroscopic and possess considerably strong adhesion tendencies. Considering the fact that by-products produced from the waste gas irradiated with electron beams are ammonium sulfate and/or ammonium nitrate which are hygroscopic and have very small particle diameters, we assumed that, unlike fly ash which is deposited and settles inside the duct, the by-product dust floats in the gas and flows together with the gas steam and is consequently attached to and accumulates on the duct wall at positions where the flow of gas is turbulent.

On the basis of the above-described assumption, we set the gas flow velocity at 10 m/sec even though this was discordant with the conventional design criterion concerning ducts for waste gas containing dust and passed waste gas through at the set flow velocity. Contrary to general belief, the rate of adhesion of dust was found to decrease to a considerable extent. It has also been revealed that substantially no dust becomes attached to the duct wall when the gas flow velocity is 5 m/sec or less. These results may be understood to prove that the above-described assumption is correct.

We also examined the configuration of the duct extending from the outlet of the reactor to the by-product dust collector and found that a duct having a rectangular cross-sectional configuration is more effective in inhibiting adhesion of dust than a duct having a circular cross-sectional configuration for the same average flow velocity of waste gas. Although it was feared that the flow of gas might become turbulent at the corners of a duct having a rectangular cross-sectional configuration such as to encourage adhesion and accumulation of dust, on the contrary, an even more favorable result was obtained. It is considered that the adhesion inhibiting effect produced by a relatively low flow velocity at the corners exceeds the propensity for adhesion to occur due to the turbulent flow at the corners.

Although in the foregoing description of the prior art the waste gas ducts are disposed within the maze 15 made of a shielding material, it is in practice preferable to employ a maze made of a shielding material as the waste gas duct itself.

It has been found that any dust attached to the duct wall readily dissolves in water. It is, therefore, preferable to adopt a water washing process for cleaning the duct.

In this waste gas treating method, water spray is employed to cool down the waste gas generated from the boiler, as shown in FIG. 1. Accordingly, it is preferable to employ wash water dischanged from the duct washing equipment to cool the waste gas.

The dust attached to the inner wall of the duct may be scraped off by a mechanical means, for example, a scraper, in place of the above-described water washing process. Accordingly, it is also practical to remove the attached dust by such a mechanical means which may be installed within the duct.

The waste gas passing through the duct after irradiation with electron beams enters the by-product dust collector. The dust may be collected by either an electrostatic precipitator (ESP) alone or combination of an electrostatic precipitator and a bag filter. In this case, the dust collecting means to be adopted may be determined on the basis of the rate of desulfurization, the rate of denitration, the amount of leakage of ammonia and the stringency of effluent dust regulations.

Hereinunder, the present invention will be described more specifically by way of Example. However, the present invention is in no way restricted by the Example.

EXAMPLE

Figure 2:
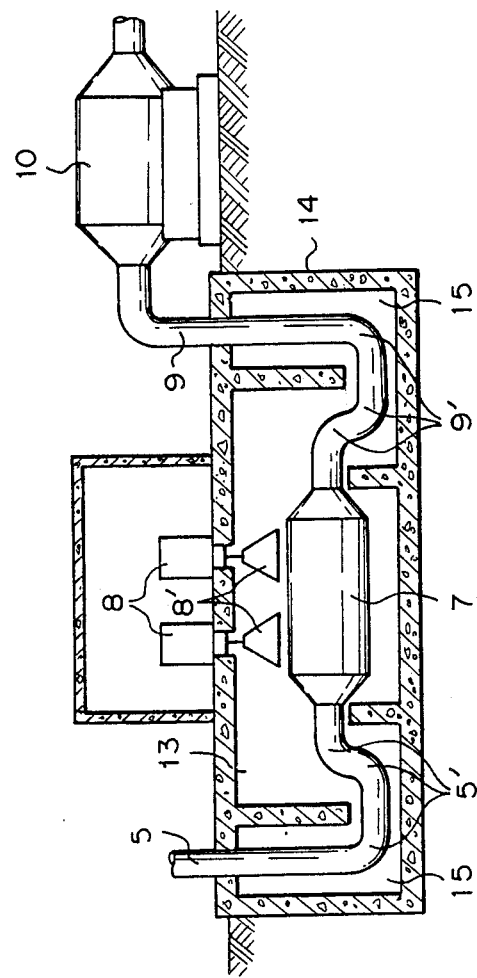
FIG. 2 illustrates the structure of a typical electron beam irradiation chamber.

Waste gas (8000 Nm$^3$/h) containing $SO_x$ (1600 ppm) and $NO_x$ (350 ppm) was cooled down to 70° C. and then introduced into a reactor where it was irradiated with electron beams at a dose of 1.8 Mrad. After being subjected to this irradiation the waste gas was passed through a duct (denoted by the reference numeral 9' in FIG. 2) and introduced into an electrostatic precipitator where the resulting dust was separated and the treated gas released into the atmosphere. The rates of desulfurization and denitration were both about 90%. Samples (1200 Nm$^3$/h) were extracted from the irradiated waste gas and introduced into the various ducts, shown in Table 1. An experimental operation was carried out for about 150 hours for each duct and gas flow velocity. After the completion of the test, the thickness of the by-product attached to the inner wall of each duct was measured. The results are shown in Table 1.

TABLE 1

| Duct configuration | Flow velocity of gas | Thickness of deposit of by-product |
| --- | --- | --- |
| Circular (diameter = 15 cm) | About 20 m/s | About 30 mm |
| Circular (diameter = 21 cm) | About 10 m/s | About 3 mm |
| Circular (diameter = 30 cm) | About 5 m/s | Substantially no deposition |
| Circular (diameter = 39 cm) | About 3 m/s | Substantially no deposition |
| Square (length of each side: 19 cm) | About 10 m/s | About 2 mm |

According to the present invention, the flow velocity of waste gas within a duct which extends from an electron beam irradiation reactor to at least a first by-product dust collector is set at 10 m/sec or less, thereby enabling inhibition of adhesion and deposition of the resulting dust inside the duct. As a result, it is possible to inhibit increase in the pressure loss of the waste gas being treated and to enable stable operation of the waste gas treating process.

What is claimed is:

1. A method for inhibiting adhesion of a waste gas treatment by-product inside a duct, said waste gas containing components such as $SO_x$ and $NO_x$, comprising the steps of:
    adding ammonia to said waste gas;
    irradiating said waste gas with electron beams; and
    after irradiating, feeding said waste gas from a reactor through said duct at a flow velocity such that substantially no deposition of said by-product occurs but no more than 10 m/sec until said waste gas reaches a first by-product collector.

2. The method according to claim 1, wherein said velocity in said step of feeding is 5 m/sec or less.

3. The method according to claim 1 or 2, wherein said step of feeding comprises passing said waste gas through a duct having a rectangular cross-sectional configuration.

4. The method according to claim 3, wherein said step of feeding comprises passing said waste gas through a duct made of an x-ray shielding material.

5. The method according to claim 1 or 2, wherein said step of feeding comprises passing said waste gas through a duct made of an x-ray shielding material.

6. The method according to claim 2, further comprising the step of removing dust attached to the inside of said duct.

7. The method according to claim 6, wherein the step of removing dust comprises washing said duct with water.

8. The method according to claim 7, further comprising the step of cooling said waste gas prior to irradiating said waste gas with said water used in said washing step.

* * * * *